June 27, 1933.    J. J. FINDLATER    1,915,657
METHOD OF MAKING A COMPOSITE DIE ELEMENT
Filed June 28, 1930

INVENTOR
John J. Findlater.
BY
ATTORNEYS.

Patented June 27, 1933

1,915,657

UNITED STATES PATENT OFFICE

JOHN J. FINDLATER, OF FERNDALE, MICHIGAN

METHOD OF MAKING A COMPOSITE DIE ELEMENT

Application filed June 28, 1930. Serial No. 464,441.

This invention relates to dies of the composite type and particularly to such dies as are employed in blanking and shearing operations.

Composite dies for such purposes are, in themselves, old in the art. In the past, such dies have generally been made by providing a body or base portion of wrought iron and a shearing or cutting portion of hardenable steel. In joining these two parts together they have been brought up to a sufficient temperature to bring the surface of the wrought iron base or body member to a fluid condition and the hardenable steel member has then been placed in position on the base or body and simply tapped down into place, and during cooling of the two pieces, the hardenable steel member becomes firmly adhered to the base or body member. The two members thus secured together may thereafter be brought to suitable temperature and then quenched, resulting in hardening of the hardenable steel portion thereof.

Another method that has been followed in the past is to form the base or body member of machine steel, and place the hardenable steel member into position thereon and pass an electric current between them, with a result that the hardenable steel member and the base member are secured together by an operation similar to a spot welding operation.

As a general rule where such members are secured together by either of the above described processes, it is substantially impossible, after the members have once been secured together, to change their shape where such change entails a material bending of the two members, and this for the reason that in bringing the members up to a suitable temperature to enable them to be bent, the bond between the two members is weakened to such an extent that it is not sufficiently strong to withstand the difference in stress as set up in the two members during the bending operation, with a result that the two portions tend to slide on each other and the bond between them is ruptured in one or more places, thus rendering the members unsuitable, or at least less fit, for the purposes which they are intended to serve.

In accordance with the present invention, I provide a composite die in which the two members are so intimately connected together that they may be reheated and bent, rolled, forged or otherwise worked to any shape desired without any danger of loosening one from the other or affecting the bond between them.

Accordingly, it is an object of the present invention to provide an improved process in the manufacture of composite dies.

Another object is to provide a composite die in which the metal of the two portions thereof at the junction between them is intimately intermingled.

Another object is to provide a compose die that may be repeatedly heated and worked without affecting the bond between the different portions thereof.

A further object is to provide a composite die that may be originally formed in straight condition and thereafter bent, forged, rolled or otherwise modified to any desired form without affecting the bond between the different portions thereof in any manner whatsoever.

The above being among the objects of the present invention the same consists in certain features of construction, combinations of parts and method of manufacture to be hereinafter described with reference to the accompanying drawing, and then claimed, having the above and other objects in view.

In the accompanying drawing which illustrates a suitable embodiment of the present invention, and in which like numerals refer to like parts throughout the several different views,—

Figure 1:
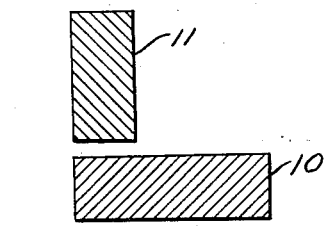
Fig. 1 is a vertical sectional view taken through two elements of a composite die and showing the same in slightly spaced relationship as in the manner they are positioned during the first step of operation in the manufacture of such die.
Figure 2:
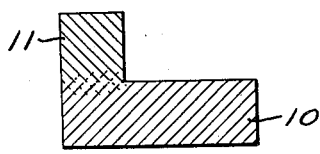
Fig. 2 is a vertical sectional view taken transversely through a composite die formed in accordance with the present invention after the two parts shown in Fig. 1 have been secured together.
Figure 3:
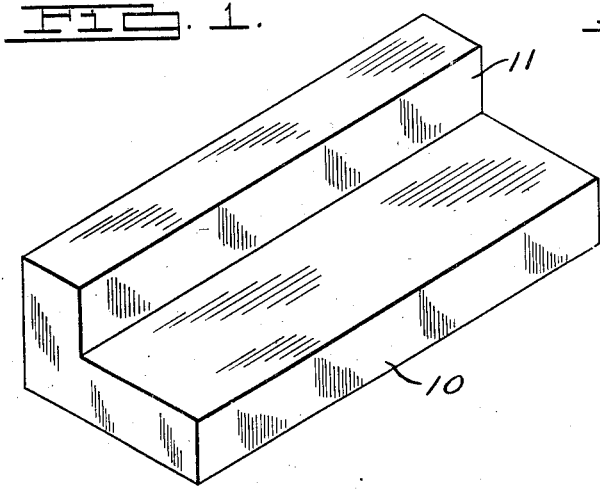
Fig. 3 is a perspective view of a composite die section.

Referring to the drawing I show in Fig. 1 a block 10 of substantially non-hardenable ferrous metal, preferably machine steel, and a smaller block 11 of hardenable steel or steel alloy which may or may not be of the air hardening type. The block 10 is usually of greater horizontal dimensions than vertical dimensions, as shown, and the block 11 is usually of greater vertical dimensions than horizontal dimensions, as shown. As in the case of most composite dies, it is desired to secure the block 11 of hardenable material along one edge of the base, and the block 11 is so positioned relative to the base 10 in Fig. 1. In accordance with the present invention, the blocks 10 and 11 are gripped or secured respectively in the opposite chucks or holding members of an electric arc welding machine. Such machine must be of a relatively great capacity as is illustrated by the fact that I have found that a 600 KVA welding machine is most suitable for this use. The members 10 and 11 while gripped in the machine are then brought together until contact is established between them and are then separated so as to establish an arc between them, and this arc is continued until from 10% to 50% of the block 11 has been melted away. I find that normally 20% to 30% of the block 11, being melted away, permits an absolutely perfect union to be formed between the two members. By the time this amount of the block 11 has been melted away, the surface between the two members, between which the arcing takes place, has become extremely fluid and approaches a boiling condition, causing the metal which has dropped off the member 11 to become intimately mixed with that of the member 10. The two members are then pressed together and the current shut off on the machine, with the result that the metal of the two members becomes intimately mixed with each other and in cooling establishes a joint between the two members which is equally as strong as the members themselves. In fact, it is absolutely impossible to determine any line of demarcation between the two members and a microphotograph of the joint between them clearly establishes an intermingling of the metal of the two members over a relatively great depth. As a result of this intimate bond, the die when thus completed and as illustrated in Figs. 2 and 3, may be heated to a suitable temperature and then be worked any shape or curvature desired without any possibility of one of the portions shifting relative to the other, or any weakening of any kind of the bond between them.

Figure 4:
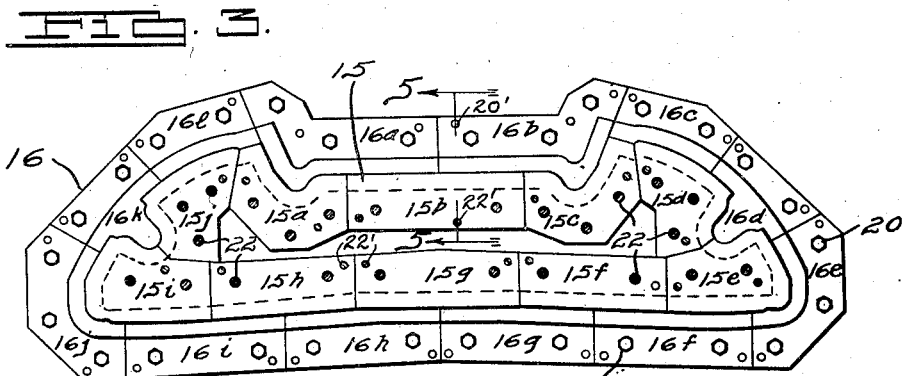
Fig. 4 is a plan view of an illustrative embodiment of a blanking or shearing die formed of composite die parts, the same being taken as on the line 4—4 of Fig. 5.
Figure 5:
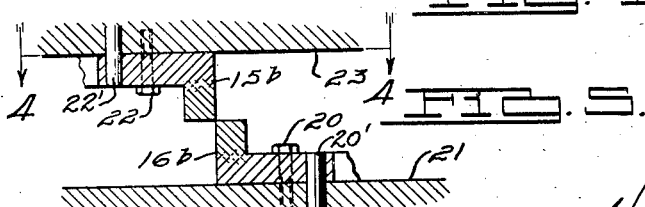
Fig. 5 is a fragmentary vertical sectional view taken through the die shown in Fig. 4, on the line 5—5 of Fig. 4, the dies being shown in operative position relative to one another and secured to the head and table respectively of a press.

In the formation of large dies it is the usual practice to make the same of a plurality of sections each of which is made up of relatively short lengths formed as above described. For instance, I show in Fig. 4 by way of illustration, a blanking die for a relatively large, irregularly shaped sheet metal part (not shown). The die shown in Fig. 4, and shown in section in Fig. 5, comprises an upper die assembly 15 and a lower die assembly 16. The upper die assembly is formed of a plurality of sections 15a to 15j respectively, and the lower die assembly 16 is formed from a plurality of sections 16a to 16l respectively. The hardenable steel portions of each of the sections 15 is positioned around the outer margin of the upper die and extending downwardly therefrom as illustrated in Fig. 5, and the hardenable steel portion of the lower die 16 is positioned around the inner margin of the die 16 and extending upwardly therefrom, the outer edges of the upper die and the inner edges of the lower die being positioned in substantial vertical alignment so that in passing the upper die down into the lower die a sheet of material (not shown) placed between them will be sheared or blanked to the proper shape as determined by the contour of the die.

It will be noted that substantially every section of the dies 15 and 16 are of more-or-less curved conformation at their cutting edges, and the present invention is particularly applicable to dies of this type.

Figure 6:
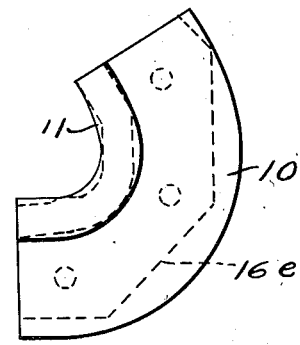
Fig. 6 is an enlarged plan view of one of the elements of the dies shown in Fig. 4 illustrating the manner in which it is formed from a member such as is shown in Fig. 3.

To take a specific example, the operation forming the section 16e may be followed through, the same general steps of formation being applicable to all of the remaining sections. The straight die section, such as is illustrated in Fig. 3 and formed as described in connection with Figs. 1 and 2, is first heated and then bent to the shape indicated in Fig. 6. The shape of the desired finished part 16e is then laid out on the member illustrated in Fig. 6 as indicated by the dotted lines, and then the member is machined to bring it to the shape indicated by the dotted lines, it being understood that sufficient stock is left for the final finishing operation. The piece is then heated and quenched so as to harden the hardenable steel portion or, if this portion is air-hardening steel, heated and cooled in air. The cutting surfaces or edges of the member are then ground to the desired finished contour. Suitable openings, not shown, are drilled in the machine steel portion thereof and the finished member is then bolted or otherwise suitably secured as by bolts or screws 20 to the table 21 of a power press in correct relationship with respect to the remaining sections, as determined and maintained by dowel pins 20'. Likewise the sections 15 are secured in a similar manner by bolts or screws such as 22 and dowels 22' to the head 23 of the press in proper cooperating relationship with respect to the remaining sections, and to the sections 16 of the lower die assembly.

While I have above described a composite die element as made up of a base member of relatively greater width than thickness, and the hardenable member as being secured to one of the wide faces thereof, it will be apparent that this arrangement is simply one form of such dies and that the size, shape and contour of both portions may be materially different from that shown, in some cases, and they may be secured to each other in any position desired. Also, although I have shown and described the members or portions as originally being relatively straight, it will be apparent that in some cases either one or both thereof may be curved in one or more planes prior to their being secured together. This last feature will be particularly true where the hardenable member is of cast construction not permitting bending under any circumstances, in which case it must be cast to approximately finished curvature and thereafter be secured to its base or supporting portion in the manner above described.

In conclusion it may be stated that the article herein provided has a bond between the two portions thereof of a nature never before produced in articles of this kind, and that the bond between the portions thereof is of such an intimate nature as to permit a blank made up as described to be bent, forged, rolled or otherwise worked, particularly where the hardenable portion is not of cast construction, so as to form a curved, elongated, upset or otherwise formed final product in which the bond between the portions has not been weakened in any respect.

In the following claims where I employ the word "hardenable steel" or its equivalent, it is to be understood that this term is meant to include any ferrous alloy, of either wrought or cast nature, suitable for the use described.

Formal changes may be made in the specific embodiment of the invention described, without departing from the spirit or substance of the broad invention, the scope of which is commensurate with the appended claims.

What I claim is:

1. The method of making a composite die element, comprising in securing a block of hardenable steel to a block substantially non-hardenable ferrous metal by first causing an electric arc to pass between said blocks until approximately 30% of said hardenable steel block has been melted away and deposited upon a surface of the other, and then pressing said blocks together to form a composite die element adapted to be bent to desired contour.

2. The method of making a composite die element, of curved contour, comprising in providing a relatively straight block of hardenable ferrous metal and a relatively straight block of substantially non-hardenable ferrous metal, placing said blocks in approximately the relative positions they are to assume in the finished product, passing an electric arc between them until a portion of one of them has been melted away and deposited upon a surface of the other, pressing said blocks together, and then bending said blocks to the desired contour.

3. The method of making a composite die element of curved contour, comprising in providing a relatively straight block of hardenable ferrous metal and a relatively straight block of substantially non-hardenable ferrous metal, positioning said blocks with a surface of each in approximate alignment, passing an electric arc between the adjacent faces of said blocks until 10% to 50% of the hardenable block has been melted away and deposited upon a surface of the other and then pressing said blocks together, and then heating said blocks and bending them to the desired contour.

4. The method of making a composite die element of curved contour, comprising in providing a relatively straight block of hardenable ferrous metal and a relatively straight block of substantially non-hardenable ferrous metal, positioning said blocks with a surface of each in approximate alignment, passing an electric arc between the adjacent faces of said blocks until 10% to 50% of the hardenable block has been melted away and deposited upon a surface of the other and then pressing said blocks together, then heating said blocks and bending them to the desired contour, then rough machining said blocks, then heating and quenching them, and then finish machining said blocks.

JOHN J. FINDLATER.